US008837834B2

(12) United States Patent
Chouly et al.

(10) Patent No.: US 8,837,834 B2
(45) Date of Patent: Sep. 16, 2014

(54) METHOD AND DEVICE FOR IDENTIFYING AN IMAGE ACQUISITION FEATURE OF A DIGITAL IMAGE AND APPARATUS FOR IMPLEMENTING SUCH A DEVICE

(75) Inventors: Antoine Chouly, Paris (FR); Sandrine Merigeault Rhein, Bordeaux (FR)

(73) Assignees: ST-Ericsson SA, Plan-les-Ouates (CH); ST-Ericsson (France) SAS, Grenoble (FR)

( * ) Notice: Subject to any disclaimer, the term of this patent is extended or adjusted under 35 U.S.C. 154(b) by 209 days.

(21) Appl. No.: 13/517,200

(22) PCT Filed: Dec. 17, 2010

(86) PCT No.: PCT/EP2010/070059
§ 371 (c)(1),
(2), (4) Date: Aug. 31, 2012

(87) PCT Pub. No.: WO2011/076681
PCT Pub. Date: Jun. 30, 2011

(65) Prior Publication Data
US 2013/0121585 A1 May 16, 2013

(30) Foreign Application Priority Data
Dec. 21, 2009 (FR) ..................... 09 59321

(51) Int. Cl.
G06K 9/46 (2006.01)
G06T 7/00 (2006.01)
G06K 9/52 (2006.01)

(52) U.S. Cl.
CPC ................ *G06K 9/46* (2013.01); *G06K 9/4633* (2013.01); *G06T 7/0061* (2013.01); *G06T 7/004* (2013.01); *G06T 2207/20061* (2013.01); *G06T 7/0018* (2013.01); *G06K 9/52* (2013.01)

USPC .......................................... 382/190; 382/170

(58) Field of Classification Search
CPC .................. G06T 2207/10016; G06T 7/0083; G06T 7/0081; G06K 9/48; G06K 9/4609
USPC ................................................. 382/190, 173
See application file for complete search history.

(56) References Cited

PUBLICATIONS

Yang et al. "Recognition and Localization of a Flat Symmetric Object from a Single Perspective Image". Electrical and Computer Engineering ECE Technical Reports; Dec. 1994; pp. 1-30; vol. 94; School of Electrical Engineering, Purdue University, West Lafayette, Indiana.
Farin et al. "Robust Camera Calibration for Sport Videos using Court Models." Proceedings of the International Society for Optical Enginerring (SPIE); Jan. 1, 2004; pp. 80-91; vol. 5307.
Suttorp et al. "Robust Vanishing Point Estimation for Driver Assistance." Proceedings of the IEEE Intelligent Transportation Systems Conference; Sep. 17-20, 2006; pp. 1550-1555.

*Primary Examiner* — Ruiping Li
(74) *Attorney, Agent, or Firm* — Coats & Bennett, PLLC

(57) ABSTRACT

The invention particularly relates to a method for identifying an image acquisition feature of a digital image oriented in a coordinate system having a reference axis. According to the invention, this method comprises the steps of: (A) detecting the contours of each distinctive element of the image; -(B) forming a list including each contour constituted by a rectilinear segment; (C) searching, in the list of rectilinear contours, a pair of significant rectilinear segments; (D) in the case where step (C) is successful, checking for a condition of relative symmetry of the significant rectilinear segments with respect to the reference axis; and (E) producing, respectively in the case where step (D) is successful and in the case where one of steps (C) and (D) fails, a data respectively representative of the presence and absence of perspective in the image acquisition, with respect to the reference axis.

9 Claims, 3 Drawing Sheets

METHOD AND DEVICE FOR IDENTIFYING AN IMAGE ACQUISITION FEATURE OF A DIGITAL IMAGE AND APPARATUS FOR IMPLEMENTING SUCH A DEVICE

The invention generally relates to image processing techniques.

More specifically, the invention relates, according to a first aspect, to a method for identifying an image acquisition feature of a digital image composed of pixels and oriented in a coordinate system exhibiting at least a reference axis.

The development of digital imagery and the integration of static (photo) or dynamic (video) image acquisition features in an increasing number of apparatuses, particularly in mobile phones have given rise to new needs in terms of image analysis and/or processing.

Particularly, the currently-known techniques for searching for a perspective in a digital image are either restricted to highly specific applications or made complex by the need to have recourse to a specific equipment for the image acquisition.

For example, article "Hough Transformation Based Approach for Road Border Detection in Infrared Images, Basel Fardi and Gerd Wanielik, IEEE Intelligent Vehicles Symposium 2004" describes a perspective detection technique especially dedicated to the sides of a road and requiring the identification of a skyline containing the vanishing point of the sides of a road.

European patent EP 1 696 383 describes a perspective detection technique especially dedicated to the correction of the contents of documents observed according to a non-normal inclination to their surface.

Patent application U.S. 2007/0070207 describes a perspective detection apparatus using a three-axis accelerometer.

The inventive method, furthermore in accordance with the generic definition given in the above-mentioned preamble, forms part of the mainstream developments aiming to satisfy the new requirements in terms of analysis and/or image processing.

In a possible embodiment, this method comprises the steps of:

(A) detecting the contours of each distinctive element of the image;

(B) forming a list including each contour constituted by a rectilinear segment;

(C) searching, in the list of rectilinear contours, a pair of significant rectilinear segments;

(D) in the case where step (C) is successful, checking for a condition of relative symmetry of the significant rectilinear segments with respect to the reference axis; and (E) producing, respectively in the case where step (D) is successful and in the case where one of steps (C) and (D) fails, a data respectively representative of the presence and absence of perspective in the image acquisition, with respect to the reference axis.

Preferably, the image coordinate system comprises two reference axes, and the steps (D) and (E) are implemented with each of these two axes.

The step (A) may for example include the operations of measuring the gradient of the image intensity at each pixel, selecting, as a contour, each set of neighboring pixels having the highest gradient, and forming a contour map containing each detected contour in the image.

The step (B) may for example comprise the operations of selecting, as a pole, the origin of the image coordinate system, and considering as belonging to a same rectilinear segment, the pixels belonging to the contour map and whereof the coordinates x and y in the image coordinate system have the following equation: $x \cdot \cos(\theta) + y \cdot \sin(\theta) = \rho$, where $\theta$ is the angle that this segment forms with the reference axis, and where $\rho$ is the distance of the pole to this rectilinear segment.

The step (C) may for example comprise operations of: searching in the image for a first rectilinear segment of maximum length: checking, as a condition for validating step (C), that the length of the first rectilinear segment is higher than a length lower limit; searching among the remaining rectilinear segments of the image for at least a second rectilinear segment of acceptable length; and checking, as a condition for validating step (C), that the length of the second rectilinear segment is at least equal to a fraction of the length of the first rectilinear segment.

The length lower limit may particularly be defined as a fraction of the number of pixels that the image comprises at least along the reference axis.

The step (D) may for example comprise the operations consisting: in determining the slope of each of said first and second rectilinear segments with respect to said reference axis; checking, as a condition for validating step (D), that the slopes of said first and second rectilinear segments are of opposite signs; and checking, as a condition for validating step (D), that the respective absolute values of the slopes of said first and second rectilinear segments have between them an deviation at the most equal to a maximum permitted slope deviation.

The maximum permitted slope deviation may particularly be defined as being at the most equal to 10 degrees.

This method may comprise an additional step (F) of correcting the orientation of the image by applying to this image a rotation equal to the angle formed, with respect to the reference axis, by a line having an intermediary slope between the slopes of the first and second rectilinear segments.

The invention also relates to a device for identifying an image acquisition feature of a digital image composed of pixels and oriented in a coordinate system, this device being characterized in that it comprises means for assessing the presence or absence of a perspective in the image acquisition based solely on the pixels and the orientation of this image.

The invention also relates to a digital image capture apparatus comprising a device such as previously defined.

Other characteristics and advantages of the invention will become more apparent upon reading the following description, in no way limited with reference to the accompanying schematic drawings in which.

As previously announced, the invention relates to, according to a first aspect, a method which makes it possible to identify an image acquisition feature of a digital image.

This method is particularly applicable to images composed of pixels and oriented in a coordinate system which, typically although not necessarily, is constituted by two orthogonal reference axes Xo and Yo (FIGS. 2 and 3), intersecting at the origin O.

The method is therefore applicable to static digital images (photos) as well as to each of the images of a stream of digital video images.

The features of an image acquisition related to the invention consist in the presence or the absence of a perspective.

Although the implementation of the method does not require anything more than the mere existence of the digital image to be analyzed, located in a conventional coordinate system, the recourse to additional data may possibly be used to further reinforce the reliability of this method.

An advantageous preliminary step may consist in re-sampling the image in order to reduce its number of pixels and noise, and thus facilitate the analysis of this image.

Moreover, instead of being applied to all the color components, the method may be implemented on a component of the color space or on a determined combination of the components of this space.

Figure 1:
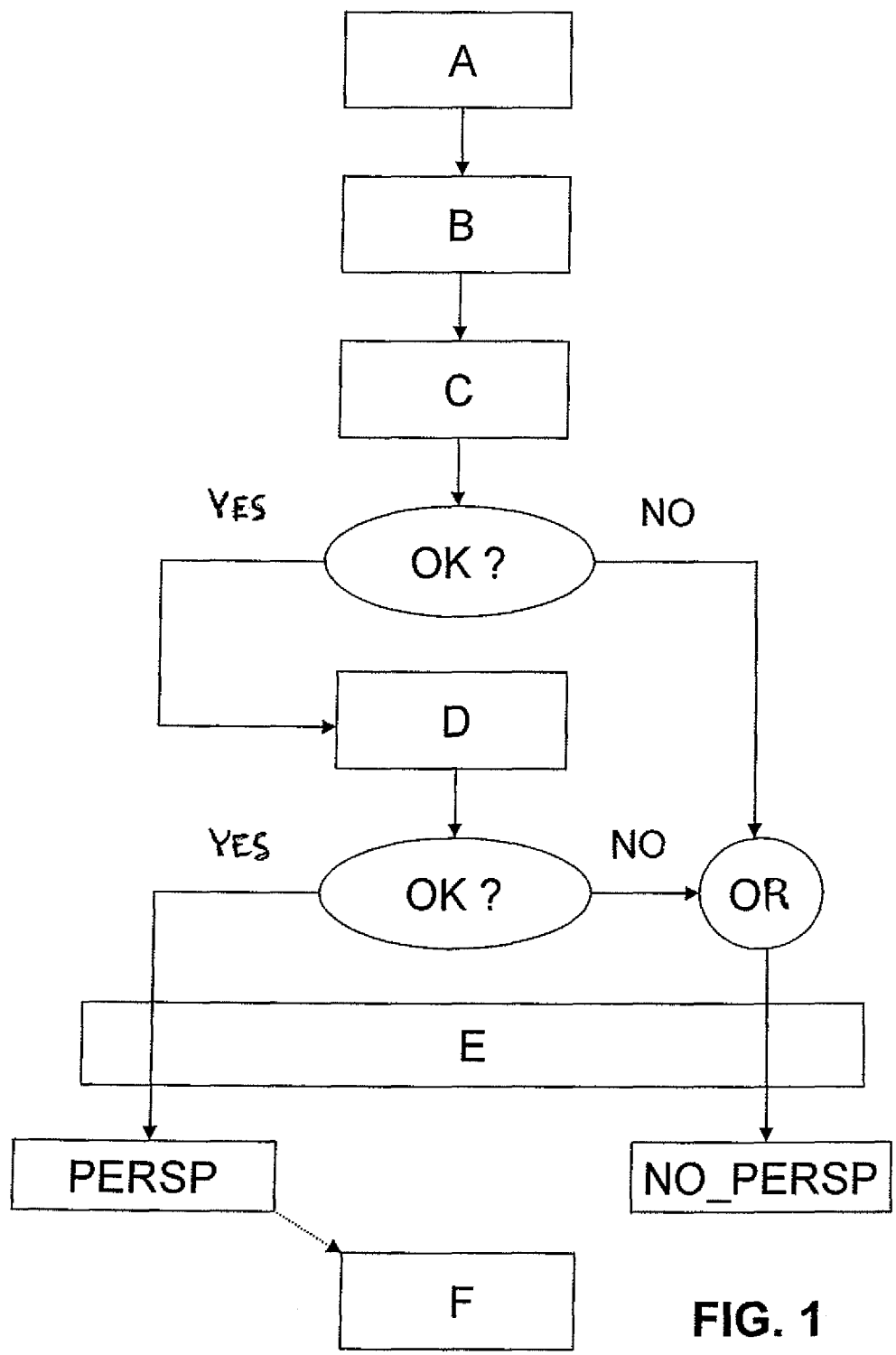
FIG. 1 is a flowchart illustrating a method in accordance with a possible embodiment.

A first step of the actual method, marked (A) on FIG. 1, consists in detecting the contours of each distinctive element of the image.

Typically, step (A) first comprises an operation of measuring the gradient of the image intensity at each pixel.

This operation may for example be achieved by using a linear filter, such as the Sobel filter or a non linear filter.

A usable non linear filter is for example described in the article: Gonzalo R. Arce, Jan Bacca and Jose L. Paredes "Nonlinear Filtering for Image Analysis and Enhancement" Image and Video Processing Handbook, Second Edition. pp. 81-100. Edited par Al Bovik, Academic Press, San Diego, Calif. 2005.

Each set of neighbouring pixels having the highest gradient is thus selected as a contour and participates in the formation of a contour map which contains all the contours detected in the image.

Another step, referenced (B) on FIG. 1 consists in forming a list including each contour constituted by a rectilinear segment.

Several techniques may be used to achieve step (B).

Particularly, it is possible to use the Hough transformation such as specifically described in the article "Use of Hough Transformation to detect Lines and Curves in Pictures" Technical Notes 36, April 1971, published in Comm. ACM, Vol. 15, No. 1, pp. 11-15 (January 1972).

Figure 2:
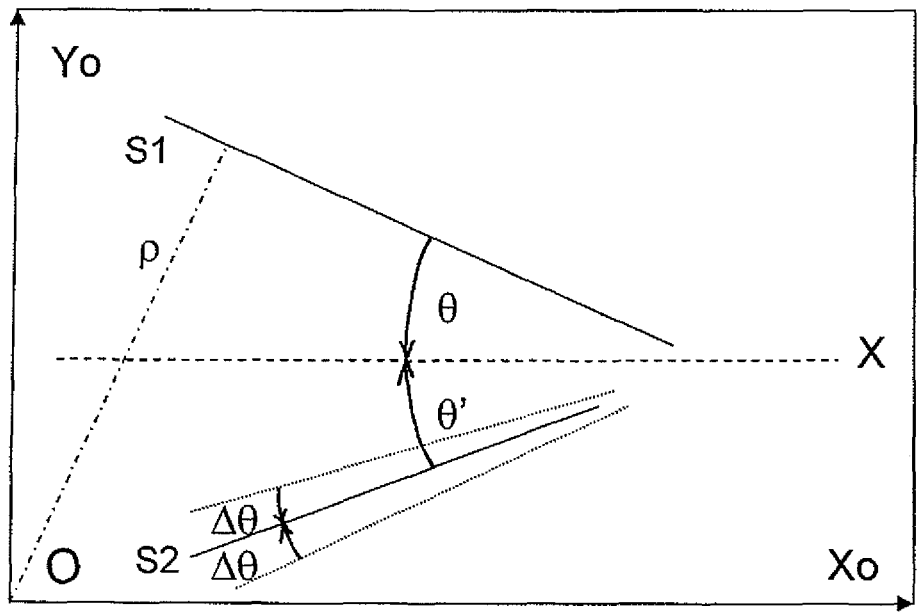
FIG. 2 is a schema illustrating an example of an image having a substantially horizontal perspective and liable to be processed in accordance with the invention.
Figure 3:
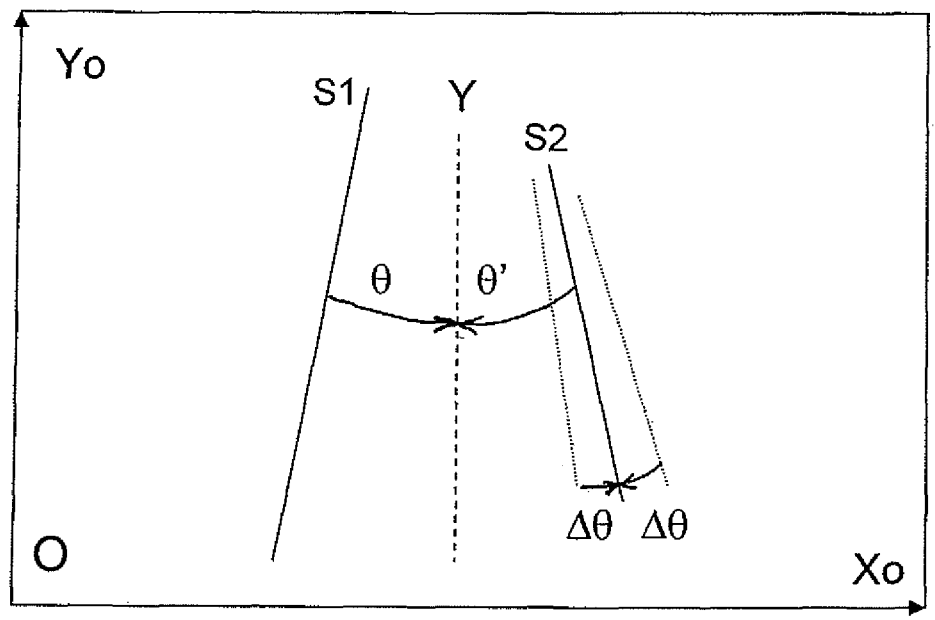
FIG. 3 is a schema illustrating an example of an image having a substantially vertical perspective and liable to be processed in accordance with the invention.

In this case, step (B) particularly comprises an operation of selecting, as a pole, the origin of the coordinate system of the image, for example the origin O of axes intersection Xo and Yo on FIGS. 2 and 3, and an operation of considering as belonging to a same rectilinear segment, the pixels belonging to the contour map and whereof the coordinates x and y in the coordinate system Xo, Yo of the image have as a equation a straight line in polar coordinates.

More particularly, are selected as belonging to a same rectilinear segment, the pixels belonging to the contour map and whereof the coordinates x and y in coordinate system Xo, Yo of the image have the following equation:

$$x \cdot \cos(\theta) + y \cdot \sin(\theta) = \rho$$

where $\theta$ is the angle formed by this segment with reference axis Xo or with reference axis Yo, and where $\rho$ is the distance of pole O from this rectilinear segment.

FIG. 2 illustrated parameters $\theta$ and $\rho$ for rectilinear segment S1, the angle $\theta$ being identified with respect to reference axis Xo, or more specifically with respect to an axis X parallel to axis Xo, which is equivalent.

In practice, determining rectilinear contours may be simplified by forming a bidimensional table called "accumulator", whereof each box is dedicated to a couple of possible values, to within one maximum deviation, of parameters $\theta$ and $\rho$, and accumulating in each of the table cases, all the pixels belonging to the contour map and whereof coordinates x and y have the following equation x. cos ($\theta$)+y. sin ($\theta$)=$\rho$ where ($\theta$) and $\rho$, constitute the couple of values to which this box is dedicated.

Another step, referenced (C) on FIG. 1, consists in searching, in the list of rectilinear contours for a pair of significant rectilinear segments.

Preferably, the step (C) comprises the following operations.

First of all, the presence of a first rectilinear segment S1 of maximum length is sought in the image.

In the case where the determination of rectilinear contours has been carried out by the construction of an accumulator as described above, the search for rectilinear segment S1 of maximum length is restricted to identifying the box of the accumulator which counts the highest number of pixels.

Then, one checks, as a validation condition of step (C), that the length of this first rectilinear segment S1 is higher than a length lower limit.

For example this length lower limit may be defined as a fraction of the number of pixels contained in the image along one or the other reference axes Xo and Yo, this first check may thus consist in checking that the number of pixels counted in the box of the accumulator, corresponding to the first rectilinear segment, represents at least a certain fraction of the number of pixels of the image according to one and/or the other of axes Xo et Yo, or a certain fraction of the total number of pixels of the image.

Then, one searches, amongst the remaining rectilinear segments of the image, a second rectilinear segment S2 of acceptable length.

For example, as an acceptable length, a second rectilinear segment S2 may be considered whereof the length, possibly expressed in number of pixels, is at least equal to a certain fraction of the length of the first rectilinear segment S1, itself possibly expressed in number of pixels.

Another step, referenced (D) on FIG. 1 and which only needs to be implemented in the case where step (C) is successful, of checking a condition of relative symmetry of the significant rectilinear segments S1 and S2 with respect to the reference axis.

Preferably, step (D) comprises the following operations.

First of all, the slope of each rectilinear segment S1 and S2 with respect to one of the reference axes Xo and Yo is determined.

In the case where the determination of rectilinear contours has been carried out by the construction of an accumulator as described above, the slope value of each rectilinear segment SI and S2 with respect to reference axis $X_0$ is directly given by the value of parameter $\theta$ to which the box of the accumulator corresponding to this segment is dedicated.

As the skilled person will easily understand, the slope value of each of the rectilinear segments S1 and S2 with respect to the reference axis Yo is derived from the slope value of these segments with respect to the reference axis Xo by subtracting 90 degrees.

Then, as validation condition of step (D), one checks that the respective slopes $\theta$ and $\theta'$ of rectilinear segments S1 and S2 are of opposite signs, thus explaining why these segments are inclined at both sides of a straight line X parallel to axis Xo on case of horizontal perspective (FIG. 2), or at both sides of a straight line Y parallel to axis Yo in case of a vertical perspective (FIG. 3).

Then, still as a validation condition of step (D) one checks, that the respective absolute values of respective slopes θ and θ' of rectilinear segments S1 and S2 have between them a deviation at the most equal to a maximum permitted slope deviation Δθ, for example at the most equal to 10 degrees, which explains the fact that these segments are at least approximately symmetrical to each other with respect to the straight line X in the case of a horizontal perspective (FIG. 2), or with respect to straight line Y in case of vertical perspective (FIG. 3).

If step (D) fails, the method may possibly be resumed, once or several times, starting from the search operation of a second rectilinear segment S2 of step (C), such as to reiterate step (D) by using a new rectilinear segment as second rectilinear segment, trying out new rectilinear segments as second rectilinear segments being nevertheless interrupted in the case where the length of all the remaining rectilinear segments becomes insufficient.

Another step, referenced (E) on FIG. 1 and which is sufficient for carrying out the purpose of the method, consists in producing, in the case where step (D) is successful, a data PERSP representative of the presence in the image acquisition, with respect to the reference axis Xo or Yo taken into account, and to produce, in the case where any one of steps (C) and (D) fails, possibly reiterated as indicated above, a data NO_PRESP representative of the absence of perspective in the image acquisition with respect to reference axis Xo or Yo taken into account.

As the skilled person will have understood upon reading the present description, when the method aims to detect a perspective according to each of axes Xo and Yo, steps (C) and (D) are implemented with each of these two axes.

Figure 4:
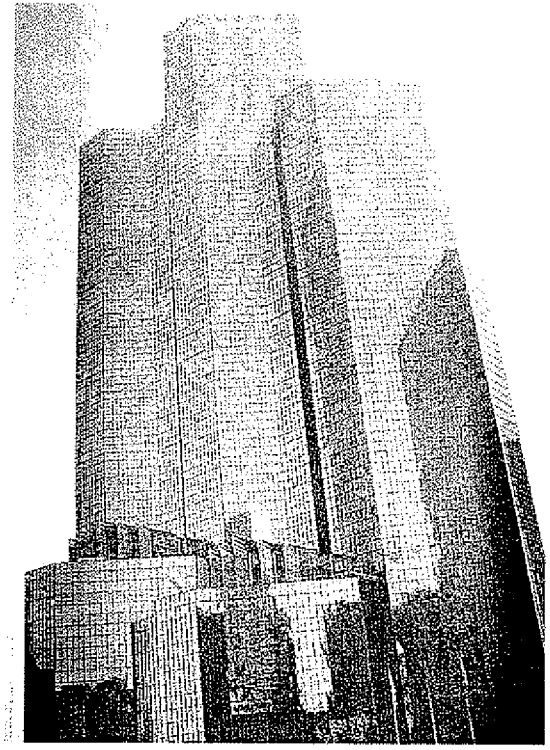
FIG. 4 is a crude real image having a substantially vertical perspective.
Figure 5:
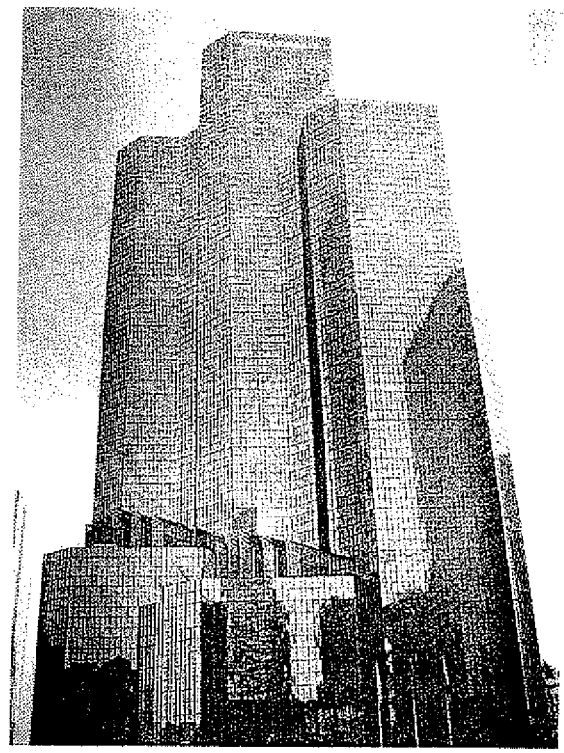
FIG. 5 is an image achieved based on the image represented by FIG. 4 and an orientation data resulting from the method implementation.

FIGS. 4 and 5 illustrate the result of the implementation of an additional and optional step of the method, marked (F), and which consists in correcting the image orientation by applying to it a rotation equal to the angle formed, with respect to the reference axis Xo or Yo according to which a perspective has been detected, by a line having an intermediary slope between slopes θ and θ' of rectilinear segments S1 and S2.

The method may also be enriched by providing to check, as an additional validation condition of step (C), that the first rectilinear segment selected S1 is sufficiently spaced from the centre of the image so that it can plausibly translate a perspective effect.

The inventive method, which enables to assess the presence or absence of a perspective in the image acquisition of a digital image based solely on the pixels and the orientation of this image in a coordinate system, may be implemented by a device for computing relatively modest performances and specifically dedicated, or not, to identifying this feature of image acquisition.

Furthermore, such a device may be integrated in every apparatus having a digital image capture functionality, such as a photography apparatus, a camcorder or a mobile phone.

The invention claimed is:

1. A method for identifying an image acquisition feature of a digital image composed of pixels and oriented in a coordinate system having at least one reference axis (Xo), the method comprising:
    (A) detecting the contours of each distinctive element of the image;
    (B) forming a list including each contour constituted by a rectilinear segment;
    (C) searching, in the list of rectilinear contours, for a pair of rectilinear segments (S1, S2);
    (D) where step (C) is successful, checking for a condition of relative symmetry of the rectilinear segments (S1, S2) with respect to the reference axis (Xo); and
    (E) producing, respectively in the case where step (D) is successful and in the case where one of steps (C) and (D) fails, a data respectively representative of the presence and absence of perspective in the image acquisition, with respect to the reference axis (Xo), the presence or absence of perspective constituting said image acquisition feature;
    wherein step (C) comprises searching in the image for a first rectilinear segment (S1) of maximum length; checking, as a condition for validating step (C), that the length of the first rectilinear segment (S1) is higher than a length lower limit; searching among the remaining rectilinear segments of the image for at least a second rectilinear segment (S2) of acceptable length; and checking, as a condition for validating step (C), that the length of the second rectilinear segment (S2) is at least equal to a fraction of the length of the first rectilinear segment (S1);
    wherein step (D) comprises determining the slope (θ, θ') of each of said first and second rectilinear segments (S1, S2) with respect to said reference axis (Xo); checking, as a condition for validating step (D), that the slopes of said first and second rectilinear segments are of opposite signs; and checking, as a condition for validating step (D), that the respective absolute values of the slopes of said first and second rectilinear segments exhibit between each other a deviation at the most equal to a maximum permitted slope deviation (Δθ); and
    further comprising (F) correcting the orientation of the image by applying to the image a rotation equal to the angle formed, with respect to the reference axis (Xo), by a line having an intermediary slope between the slopes (θ, θ') of the first and second rectilinear segments (S1, S2).

2. The method according to claim 1, wherein the coordinate system of the image comprises two reference axes (Xo, Yo), and in that steps (D) and (E) are implemented with each of these two axes (Xo, Yo).

3. The method according to claim 1, wherein step (A) comprises measuring the gradient of the image intensity at each pixel, selecting, as a contour, each set of neighboring pixels having the highest gradient, and forming a contour map containing each detected contour in the image.

4. The method according to claim 3, wherein step (B) comprises: selecting, as a pole, the origin (0) of the image coordinate system; and considering, as belonging to a same rectilinear segment, the pixels belonging to the contour map and the coordinates x and y of which in the image coordinate system satisfy the following equation: $x \cdot \cos(\theta) + y \cdot \sin(\theta) = \rho$, where θ is the angle that this segment forms with the reference axis, and where ρ is the distance of the pole to this rectilinear segment.

5. The method according to claim 1, wherein said length lower limit is defined as a fraction of the number of pixels that the image comprises at least along the reference axis (Xo).

6. The method according to claim 1, wherein said maximum permitted slope deviation (Δθ) is at the most equal to 10 degrees.

7. The method according to claim 1, further comprising an additional step (F) of correcting the orientation of the image by applying to the image a rotation equal to the angle formed, with respect to the reference axis (Xo), by a line having an intermediary slope between the slopes (θ, θ') of the first and second rectilinear segments (S1, S2).

8. A device for identifying an image acquisition feature of a digital image composed of pixels and oriented in a coordinate system, said device configured to assess the presence or absence of a perspective in the image acquisition based solely on the pixels and the orientation of the image, the presence or absence of perspective constituting said image acquisition feature, the device comprising a computing circuit operative to:
- (A) detect the contours of each distinctive element of the image;
- (B) form a list including each contour constituted by a rectilinear segment;
- (C) search, in the list of rectilinear contours, for a pair of rectilinear segments (S1, S2);
- (D) where step (C) is successful, check for a condition of relative symmetry of the rectilinear segments (S1, S2) with respect to the reference axis (Xo); and
- (E) produce, respectively in the case where step (D) is successful and in the case where one of steps (C) and (D) fails, a data respectively representative of the presence and absence of perspective in the image acquisition, with respect to the reference axis (Xo), the presence or absence of perspective constituting said image acquisition feature;

wherein step (C) comprises searching in the image for a first rectilinear segment (S1) of maximum length; checking, as a condition for validating step (C), that the length of the first rectilinear segment (S1) is higher than a length lower limit; searching among the remaining rectilinear segments of the image for at least a second rectilinear segment (S2) of acceptable length; and checking, as a condition for validating step (C), that the length of the second rectilinear segment (S2) is at least equal to a fraction of the length of the first rectilinear segment (S1);

wherein step (D) comprises determining the slope (θ, θ') of each of said first and second rectilinear segments (S1, S2) with respect to said reference axis (Xo); checking, as a condition for validating step (D), that the slopes of said first and second rectilinear segments are of opposite signs; and checking, as a condition for validating step (D), that the respective absolute values of the slopes of said first and second rectilinear segments exhibit between each other a deviation at the most equal to a maximum permitted slope deviation (Δθ); and further comprising (F) correcting the orientation of the image by applying to the image a rotation equal to the angle formed, with respect to the reference axis (Xo), by a line having an intermediary slope between the slopes (θ, θ') of the first and second rectilinear segments (S1, S2).

9. A digital image capture apparatus configured to identify an image acquisition feature of a digital image composed of pixels and oriented in a coordinate system, said apparatus configured to assess the presence or absence of a perspective in the image acquisition based solely on the pixels and the orientation of the image, the presence or absence of perspective constituting said image acquisition feature, the device comprising a computing circuit operative to:
- (A) detect the contours of each distinctive element of the image;
- (B) form a list including each contour constituted by a rectilinear segment;
- (C) search, in the list of rectilinear contours, for a pair of rectilinear segments (S1, S2);
- (D) where step (C) is successful, check for a condition of relative symmetry of the rectilinear segments (S1, S2) with respect to the reference axis (Xo); and
- (E) produce, respectively in the case where step (D) is successful and in the case where one of steps (C) and (D) fails, a data respectively representative of the presence and absence of perspective in the image acquisition, with respect to the reference axis (Xo), the presence or absence of perspective constituting said image acquisition feature;

wherein step (C) comprises searching in the image for a first rectilinear segment (S1) of maximum length; checking, as a condition for validating step (C), that the length of the first rectilinear segment (S1) is higher than a length lower limit; searching among the remaining rectilinear segments of the image for at least a second rectilinear segment (S2) of acceptable length; and checking, as a condition for validating step (C), that the length of the second rectilinear segment (S2) is at least equal to a fraction of the length of the first rectilinear segment (S1);

wherein step (D) comprises determining the slope (θ, θ') of each of said first and second rectilinear segments (S1, S2) with respect to said reference axis (Xo); checking, as a condition for validating step (D), that the slopes of said first and second rectilinear segments are of opposite signs; and checking, as a condition for validating step (D), that the respective absolute values of the slopes of said first and second rectilinear segments exhibit between each other a deviation at the most equal to a maximum permitted slope deviation (Δθ); and further comprising (F) correcting the orientation of the image by applying to the image a rotation equal to the angle formed, with respect to the reference axis (Xo), by a line having an intermediary slope between the slopes (θ, θ') of the first and second rectilinear segments (S1, S2).

* * * * *